United States Patent
Suzuki et al.

(10) Patent No.: US 12,252,132 B2
(45) Date of Patent: Mar. 18, 2025

(54) ROAD SURFACE STATE DETERMINATION DEVICE AND TIRE SYSTEM INCLUDING SAME

(71) Applicant: DENSO CORPORATION, Kariya (JP)

(72) Inventors: Yoichiro Suzuki, Nisshin (JP); Nobuya Watabe, Kariya (JP); Masashi Mori, Kariya (JP); Takatoshi Sekizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 1066 days.

(21) Appl. No.: 16/929,862

(22) Filed: Jul. 15, 2020

(65) Prior Publication Data

US 2020/0346655 A1   Nov. 5, 2020

Related U.S. Application Data

(63) Continuation of application No. PCT/JP2019/001309, filed on Jan. 17, 2019.

(30) Foreign Application Priority Data

Jan. 19, 2018   (JP) .................................. 2018-007424

(51) Int. Cl.
*B60W 40/06*   (2012.01)
*B60C 11/24*   (2006.01)
(Continued)

(52) U.S. Cl.
CPC .......... *B60W 40/06* (2013.01); *B60C 11/246* (2013.01); *B60C 23/065* (2013.01); *G01W 1/14* (2013.01);
(Continued)

(58) Field of Classification Search
None
See application file for complete search history.

(56) References Cited

U.S. PATENT DOCUMENTS

| | | | |
|---|---|---|---|
| 2015/0166072 A1* | 6/2015 | Powers | B60W 40/076 701/1 |
| 2015/0210286 A1 | 7/2015 | Hanatsuka et al. | |
| 2019/0212138 A1* | 7/2019 | Hanatsuka | G01B 17/08 |

FOREIGN PATENT DOCUMENTS

JP         2014051195 A  *  3/2014

OTHER PUBLICATIONS

U.S. Appl. No. 16/904,260, filed Jun. 17, 2020, Suzuki et al.
(Continued)

*Primary Examiner* — Aniss Chad
*Assistant Examiner* — Madison R. Inserra
(74) *Attorney, Agent, or Firm* — Harness, Dickey & Pierce, P.L.C.

(57) ABSTRACT

A road surface state determination device includes a tire-side device and a vehicle-body-side system. The tire-side device is attached to each of a plurality of tires included in a vehicle. The vehicle-body-side system is included in a body of the vehicle. The tire-side device may output a detection signal corresponding to a magnitude of vibration of the tire. The tire-side device may sense the detection signal and generate road surface data indicative of a road surface state appearing in a waveform of the detection signal. The tire-side device may transmit the road surface data. The vehicle-body-side system may perform bidirectional communication with the tire-side device and receive the road surface data. The vehicle-body-side system may determine the road surface state of a road surface on which the vehicle is traveling based on the road surface data.

17 Claims, 5 Drawing Sheets

(51) Int. Cl.
  *B60C 23/06*   (2006.01)
  *G01W 1/14*    (2006.01)
  B60C 23/04    (2006.01)
  B60T 8/172    (2006.01)
  G01M 99/00    (2011.01)

(52) U.S. Cl.
  CPC ..... *B60W 2422/70* (2013.01); *B60W 2530/20* (2013.01); *B60W 2552/35* (2020.02)

(56) References Cited

OTHER PUBLICATIONS

U.S. Appl. No. 16/910,778, filed Jun. 24, 2020, Sanji et al.
U.S. Appl. No. 16/859,524, filed Apr. 27, 2020, Sekizawa.
U.S. Appl. No. 16/859,799, filed Apr. 27, 2020, Sekizawa.

* cited by examiner

ROAD SURFACE STATE DETERMINATION DEVICE AND TIRE SYSTEM INCLUDING SAME

CROSS REFERENCE TO RELATED APPLICATIONS

The present application is a continuation application of International Patent Application No. PCT/JP2019/001309 filed on Jan. 17, 2019, which designated the U.S. and claims the benefit of priority from Japanese Patent Application No. 2018-007424 filed on Jan. 19, 2018. The entire disclosures of all of the above applications are incorporated herein by reference.

TECHNICAL FIELD

The present disclosure relates to a road surface state determination device which detects vibration applied to a tire in a tire-side device, generates road surface data indicative of a road surface state based on vibration data, transmits the road surface data to a vehicle-body-side system, and determines the road surface state based on the road surface data. The present disclosure also relates to a tire system including the road surface state determination device.

BACKGROUND

A road surface state determination device that has an acceleration sensor provided in a back surface of a tire tread, detects vibration applied to a tire using the acceleration sensor, and estimates a road surface state based on a result of the detection of the vibration has been proposed. The road surface state determination device generates data related to the road surface state based on a waveform of the vibration applied to the tire that has been detected by the acceleration sensor and transmits the data from each of wheels to a vehicle-body-side receiver or the like to estimate the road surface state.

SUMMARY

The present disclosure provides a road surface state determination device. The road surface state determination device includes a tire-side device and a vehicle-body-side system. The tire-side device is attached to each of a plurality of tires included in a vehicle. The vehicle-body-side system is included in a body of the vehicle. The tire-side device may output a detection signal corresponding to a magnitude of vibration of the tire. The tire-side device may sense the detection signal and generate road surface data indicative of a road surface state appearing in a waveform of the detection signal. The tire-side device may transmit the road surface data. The vehicle-body-side system may perform bidirectional communication with the tire-side device and receive the road surface data. The vehicle-body-side system may determine the road surface state of a road surface on which the vehicle is traveling based on the road surface data.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
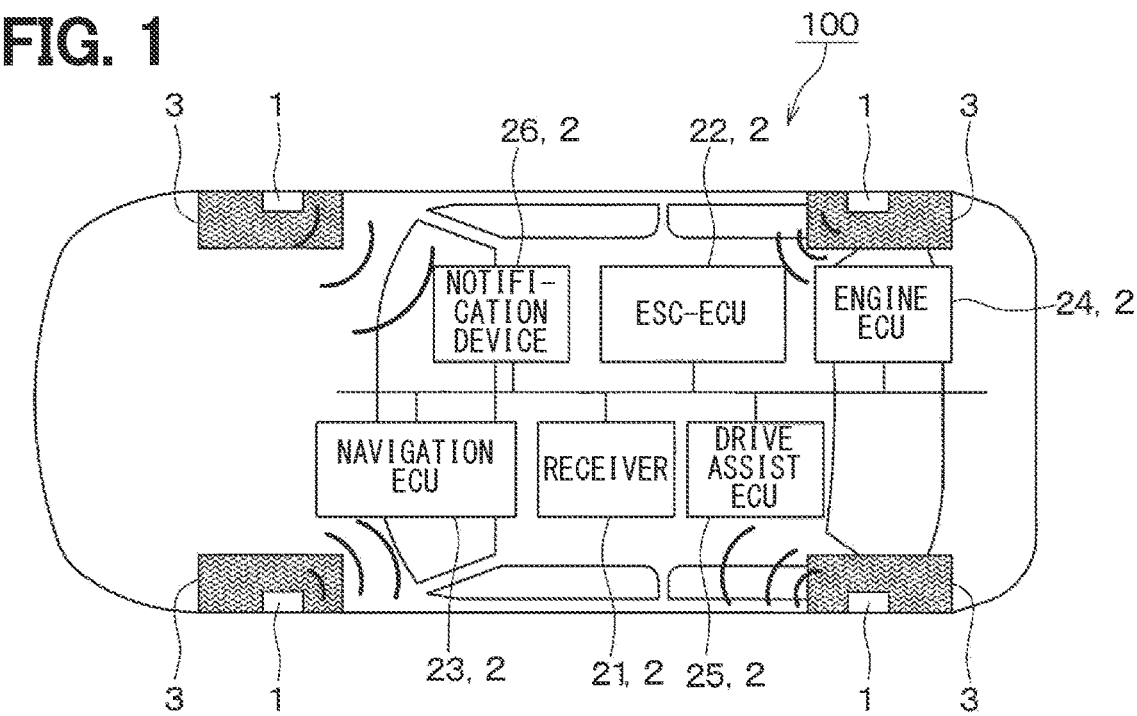
FIG. 1 is a diagram illustrating a block configuration of a tire system to which a tire-side device according to a first embodiment is applied in a state where the tire system is mounted in a vehicle.

Since a tire-side device of a road surface state determination device such as an acceleration sensor is provided in a tire and a battery cannot easily be replaced, it is necessary to perform sensing and data communication using limited power. When the tire-side device attached to each of the wheels performs data communication without limit, a battery life is reduced. As a result, it is required to elongate a sensing interval and a data communication interval in consideration of the battery life. However, in this case, a change in the road surface state cannot promptly be determined.

The present disclosure to provide a road surface state determination device that reduces power consumption and reliably determines a road surface state. The present disclosure also provides a tire system including the road surface state determination device.

An exemplary embodiment of the present disclosure provides a road surface state determination device that includes a tire-side device and a vehicle-body-side system. The tire-side device is attached to each of a plurality of tires included in a vehicle. The vehicle-body-side system is included in a body of the vehicle. The tire-side device includes a vibration detection unit, a control unit, and a first data communication unit. The vibration detection unit is configured to output a detection signal corresponding to a magnitude of vibration of the tire. The control unit is configured to sense the detection signal and generate road surface data indicative of a road surface state appearing in a waveform of the detection signal. The first data communication unit is configured to transmit the road surface data. The vehicle-body-side system includes a second data communication unit and a road surface determination unit. The second data communication unit is configured to perform bidirectional communication with the tire-side device and receive the road surface data. The road surface determination unit is configured to determine the road surface state of a road surface on which the vehicle is traveling based on the road surface data. The vehicle-body-side system further includes an instruction determination unit configured to determine at least one of a sensing condition for sensing the detection signal by the control unit, a signal processing condition for the detection signal, and a communication condition for transmitting the road surface data, and cause the second data communication unit to transmit instruction data indicative of the determination of the instruction determination unit to the tire-side device. The control unit includes an instruction execution unit configured to receive the instruction data through the first data communication unit and set, based on the instruction data, the at least one of the sensing condition, the signal processing condition, and the communication condition.

In the exemplary embodiment of the present disclosure, the road surface state determination device can determine the road surface state of the road surface on which the vehicle is traveling. In addition, various conditions for generating the road surface data used when the road surface state is determined and for transmitting the road surface data to the vehicle-body-side system are transmitted in advance as the instruction data from the vehicle-body-side system to the tire-side device. Thus, the road surface state determination device can reduce power consumption and reliably determine the road surface state.

Hereinafter, some embodiments of the disclosure are described with reference to the accompanying drawings. In the following embodiments, the same or equivalent parts are designated by like reference signs for explanation.

First Embodiment

Referring to FIGS. 1 to 6, a description will be given of a tire system 100 having a road surface state determining function according to a first embodiment. The tire system 100 according to the first embodiment determines a road surface state during driving based on vibration applied to a ground contact surface of a tire provided in each of wheels of a vehicle, and also performs warning of danger to the vehicle, vehicle movement control, and the like based on the road surface state.

Figure 2:
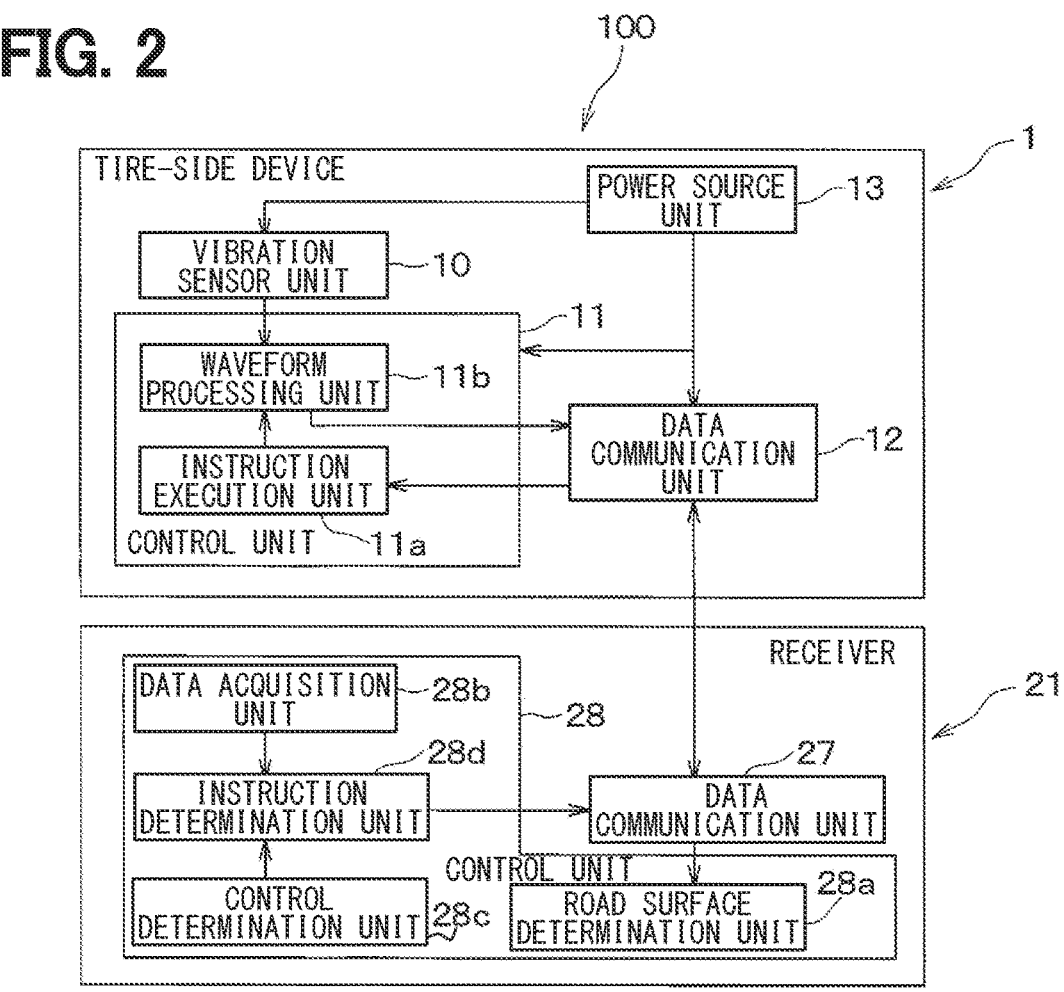
FIG. 2 is a block diagram illustrating the tire-side device and a vehicle-body-side system.

As illustrated in FIGS. 1 and 2, the tire system 100 is configured to include a tire-side device 1 provided on a wheel side and a vehicle-body-side system 2 including individual units provided on a vehicle body side. The vehicle-body-side system 2 includes a receiver 21, various electronic control units (hereinafter referred to as ECUs) 22 to 25, a notification device 26, and the like. The various ECUs 22 to 25 include an ESC-ECU 22 (abbreviation of Electronic Stability Control ECU) 22 for brake control, a navigation ECU 23 for navigation control, an engine ECU 24 for engine control, a drive assist ECU 25 for drive assist control, and the like. Note that a portion of the tire system 100 which implements the road surface state determining function corresponds to a road surface state determination device. In the case of the first embodiment, the tire-side devices 1 and the receiver 21 of the vehicle-body-side system 2 are included in the road surface state determination device.

The tire system 100 of the first embodiment causes the tire-side device 1 to transmit data (hereinafter referred to as road surface data) based on a road surface state traveled by a tire 3, and also causes the receiver 21 to receive the road surface data and determine the road surface state. The tire system 100 also transmits a result of the determination of the road surface state by the receiver 21 to the notification device 26, and causes the notification device 26 to report the result of the determination of the road surface state. As a result, it becomes possible to report a road surface state such as, e.g., a dry road, a wet road, or a frozen road to a driver and also warn the driver when the road has a slippery road surface. The tire system 100 also reports the road surface state to the ESC-ECU 22 which performs vehicle movement control or the like to cause the ESC-ECU 22 to perform the vehicle movement control for avoiding danger. For example, when the road is frozen, the ESC-ECU 22 or the like is caused to reduce a braking force generated based on an amount of brake operation compared to that when the road is dry and thus perform the vehicle movement control corresponding to a case where a road surface p is low. Specifically, the tire-side device 1 and the vehicle-body-side system 2 are configured as follows.

Figure 3:
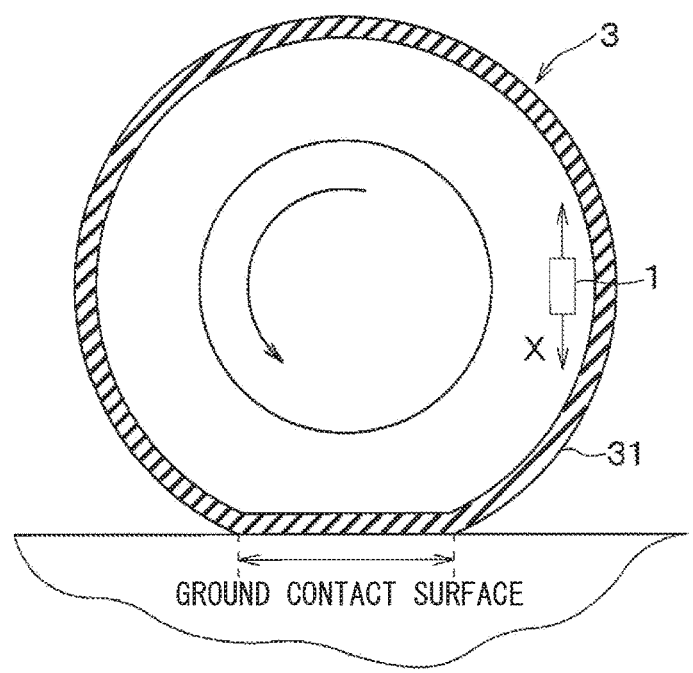
FIG. 3 is a sectional schematic diagram illustrating a tire to which the tire-side device is attached.

As illustrated in FIG. 2, the tire-side device 1 is configured to include a vibration sensor unit 10, a control unit 11, a data communication unit 12, and a power source unit 13. As illustrated in FIG. 3, the tire-side device 1 is provided on a back surface of a tread 31 of the tire 3.

The vibration sensor unit 10 is provided by a vibration detection unit for detecting the vibration applied to the tire 3. For example, the vibration sensor unit 10 is provided by an acceleration sensor. When the vibration sensor unit 10 is provided by the acceleration sensor, the vibration sensor unit 10 outputs an acceleration detection signal as a detection signal corresponding to a magnitude of vibration in a direction in contact with a circular path followed by the tire-side device 1 when the tire 3 rotates, i.e., a tire tangential direction shown by an arrow X in FIG. 3. More specifically, the vibration sensor unit 10 generates, as the detection signal, an output voltage having one of two directions shown by the arrow X as a positive direction and the opposite direction as a negative direction. For example, the vibration sensor unit 10 detects an acceleration at predetermined sampling periods which are set to be shorter than a period of one rotation of the tire 3, and outputs the detected acceleration as the detection signal. The detection signal from the vibration sensor unit 10 is represented as an output voltage or an output present, and a case where the detection signal is represented as the output voltage is described herein by way of example.

The control unit 11 is provided by a known microcomputer including a CPU, a ROM, a RAM, an I/O, and the like, and performs signal processing of the detection signal based on a program stored in the ROM or the like to generate the road surface data representing a road surface state appearing in the detection signal. The control unit 11 is configured to include, as functional units which perform such processes, an instruction execution unit 11a and a waveform processing unit 11b.

The instruction execution unit 11a sets a "sensing condition" and a "signal processing condition" for the detection signal from the vibration sensor unit 10, which is for the generation of the road surface data, and sets a "communication condition" for communication with the vehicle-body-side system 2. In the first embodiment, a case where all of the "sensing condition", the "signal processing condition", and the "communication condition" are set is described by way of example, but the instruction execution unit 11a sets at least any one of the "sensing condition", the "signal processing condition", and the "communication condition". Note that details of the "sensing condition", the "signal processing condition", and the "communication condition" will be described later.

The waveform processing unit 11b uses the detection signal output from the vibration sensor unit 10 as the detection signal representing data on vibration in the tire tangential direction to perform waveform processing of a vibration waveform represented by the detection signal and thus generate the road surface data. The waveform processing unit 11b retrieves the waveform of the detection signal from the vibration sensor unit 10 in accordance with the "sensing condition" set by the instruction execution unit 11a. In the case of the first embodiment, by performing signal processing of the detection signal for the acceleration (hereinafter referred to as the tire G) of the tire 3, the waveform processing unit 11b extracts the feature quantity of the tire G and generates data including the feature quantity as the road surface data. When the road surface data is generated, the waveform processing unit 11b transmits the road surface data to the data communication unit 12. Note that details of the feature quantity mentioned herein will be described later.

The waveform processing unit 11b also controls data transmission from the data communication unit 12 based on the "communication condition" set in the instruction execution unit 11a. Accordingly, the waveform processing unit 11b transmits the road surface data to the data communication unit 12 at a time point at which data transmission is desired to be performed to cause the data communication unit 12 to perform data communication. For example, the waveform processing unit 11b extracts the feature quantity of the tire G every time the tire 3 rotates a plurality of times and transmits the road surface data to the data communication unit 12 once or a plurality of times each time the tire 3 rotates once or a plurality of times, e.g., ten times. For example, the waveform processing unit 11b transmits, to the data communication unit 12, the road surface data including the feature quantity of the tire G extracted during one rotation of the tire 3.

The data communication unit 12 is a portion provided by a first data communication unit. For example, when the road surface data is transmitted from the waveform processing unit 11b to the data communication unit 12, at that time point, the data communication unit 12 transmits the road surface data. The time point of the data transmission from the data communication unit 12 is controlled by the waveform processing unit 11b based on the "communication condition" set by the instruction execution unit 11a. Specifically, every time the road surface data is transmitted from the waveform processing unit 11b to the data communication unit 12 each time the tire 3 rotates a plurality of times, data transmission from the data communication unit 12 is performed. Note that the "communication condition" for the data transmission from the data communication unit 12 is controlled by the waveform processing unit 11b. However, since the data transmission from the data communication unit 12 is controlled based on the "communication condition" set by the instruction execution unit 11a, it can also be said that the data transmission from the data communication unit 12 is controlled by the instruction execution unit 11a.

The data communication unit 12 is configured to be capable of bidirectional communication and functions also to receive data transmitted from the vehicle-body-side system 2. For example, the data communication unit 12 receives vehicle data item from the vehicle-body-side system 2 and transmits the vehicle data item to the instruction execution unit 11a.

The data communication unit 12 described herein has a single configuration, but may also be configured as a transmission unit and a reception unit which are separate from each other. As a mode of the bidirectional communication, various modes can be used appropriately, and Bluetooth communication including BLE (abbreviation of Bluetooth Low Energy) communication, a wireless LAN (abbreviation of Local Area Network) such as wifi, Sub-GHz communication, ultra-wide band communication, ZigBee, or the like can be used appropriately. Note that "Bluetooth" is a registered trademark.

The power source unit 13 serves as a power source of the tire-side device 1 and supplies power to each of the units included in the tire-side device 1 to operate each of the units. The power source unit 13 is provided by a battery such as, e.g., a button battery. Since the tire-side device 1 is provided in the tire 3, replacement of the battery cannot easily be performed, and therefore it is required to reduce power consumption. It may also be possible to provide the power source unit 13 of a power generator, an electrical accumulator, or the like instead of the battery. When the power source unit 13 is configured to have the power generator, a battery life presents fewer problems than when the power source unit 13 is provided by a battery, but it is difficult to generate high power. Accordingly, difficulty of reducing the power consumption remains the same as when the power source unit 13 is provided by the battery.

Meanwhile, the receiver 21, the various ECUs 22 to 25, and the notification device 26 each included in the vehicle-body-side system 2 are driven when an activation switch such as an ignition switch not shown is turned ON.

As illustrated in FIG. 2, the receiver 21 is configured to include a data communication unit 27 and a control unit 28.

The data communication unit 27 is included in a second data communication unit and performs bidirectional communication with the data communication unit 12 of the tire-side device 1. Specifically, the data communication unit 27 performs the function of receiving the road surface data including the feature quantity transmitted from the data communication unit 12 and transmitting the road surface data to the control unit 28. The data communication unit 27 also has the function of transmitting the various data transmitted from the control unit 28 to each of the tire-side devices 1. The data communication unit 27 described herein has a single configuration, but may also be configured to include a transmission unit and a reception unit which are separate from each other.

The control unit 28 is provided by a known microcomputer including a CPU, a ROM, a RAM, an I/O, and the like, and performs various processes based on programs stored in the ROM or the like. Specifically, the control unit 28 is configured to include, as functional units for determining the road surface state, a road surface determination unit 28a, a data acquisition unit 28b, a control determination unit 28c, and an instruction determination unit 28d.

The road surface determination unit 28a stores and accumulates support vector for each type of the road surface, and compares the road surface data transmitted from the control unit 11 to the support vector to determine the road surface state.

The support vector is stored and accumulated for each type of the road surface. The support vector refers to the feature quantity serving as models, which are obtained by, e.g., learning using a support vector machine. The vehicle including the tire-side devices 1 is experimentally caused to run on each type of the road surface. The feature quantities extracted at that time by the control unit 11 and corresponding to a predetermined number of tire rotations are learned and, from the extracted feature quantities, typical feature quantities corresponding to the predetermined number of rotations are extracted to be used as the support vector. For example, the feature quantities corresponding to 1,000,000 rotations are learned for each type of the road surface and, from the learned feature quantities, typical feature quantities corresponding to 100 rotations are extracted to be used as the support vectors.

Then, the road surface determination unit 28a compares the feature quantity included in the road surface data transmitted from the tire-side device 1 and received by the data communication unit 27 to the support vector stored for each type of the road surface to determine the road surface state. For example, the road surface determination unit 28a compares the feature quantity included in the road surface data received most recently to the support vector stored for each type of the road surface, and determines the road surface corresponding to the support vector closest to the feature quantity to be a presently traveled road surface.

When determining the road surface state, the road surface determination unit 28a transmits the determined road surface state to the notification device 26, and causes the notification device 26 to report the road surface state to the driver as required. As a result, the driver tries to drive in consideration of the road surface state and can avoid danger to the vehicle. For example, the control unit 28 may constantly display the determined road surface state through the notification device 26 or may also display the road surface state to warn the driver when the determined road surface state is that of a wet road, a frozen road, or the like, and the driver is required to drive carefully. In addition, from the receiver 21, the road surface state is transmitted to an ECU for performing the vehicle movement control such as the ESC-ECU 22 or the drive assist ECU 25 and, based on the transmitted road surface state, the vehicle movement control is performed.

The data acquisition unit 28b acquires a vehicle data item, a weather data item, and a traveling environment data item through the various ECUs 22 to 25. The vehicle data item includes a vehicle speed, a present position of the vehicle, a brake fluid pressure, an accelerator position, a steering angle, a yaw rate, or the like. The weather data item includes not only weather such as clear weather, rainy weather, or snowy weather, but also an amount of rainfall, an amount of snowfall, even an outside temperature, or the like. The traveling environment data item includes the road surface state such as that of a wet road, a frozen road, or a hard-compacted snow road, a rough road such as an unpaved road, a road type such as a limited highway, and a surrounding state such as the presence of a vehicle around the subject vehicle.

The control determination unit 28c acquires control data from the various ECUs 22 to 25 and determines, based on the acquired control data, the presence or absence of the vehicle movement control to be performed and a control state while the control is being performed.

The instruction determination unit 28d determines, based on the various data acquired by the data acquisition unit 28b and on a result of the determination made by the control determination unit 28c, the "sensing condition" and the "signal processing condition" for the detection signal from the vibration sensor unit 10 and the "communication condition" for the communication with the vehicle-body-side system 2. Then, the instruction determination unit 28d transmits instruction data representing details of the determined "sensing condition", "signal processing condition", and "communication condition" to the data communication unit 27, and causes the data communication unit 27 to transmit the instruction data to the tire-side device 1. When receiving the instruction data, the data communication unit 12 of the tire-side device 1 transmits the instruction data to the instruction execution unit 11a.

The ESC-ECU 22 is included in a braking control device that performs various brake control. Examples of the various brake control include skid prevention control, automatic brake control, brake control for inter-vehicular distance control, and the like. Examples of the various brake control also include automatic brake control, inter-vehicular distance control, and the like to be performed as the drive assist control. The ESC-ECU 22 drives an actuator for brake fluid pressure control to adjust a brake fluid pressure generated based on a brake operation performed by the driver or causes a brake fluid pressure to be automatically generated and applied to a wheel cylinder to thus generate a braking force. The ESC-ECU 22 can also independently control the braking force of each of the wheels. The ESC-ECU 22 performs control of the braking force as the vehicle movement control based on the road surface state transmitted from the receiver 21. For example, when the road surface state transmitted to the ESC-ECU 22 indicates a frozen road, the ESC-ECU 22 reduces a braking force to be generated based on an amount of the brake operation performed by the driver compared to that when the transmitted road surface state indicates a dry road surface. Thus, it is possible to inhibit a wheel slip and avoid danger to the vehicle.

To perform the various brake control including the skid prevention control and the like, the ESC-ECU 22 receives detection signals from the various sensors, acquires the vehicle data item from the detection signals, and acquires the vehicle data item from the other ECUs. Specifically, the ESC-ECU 22 receives the detection signals from a yaw rate sensor and a steering angle sensor each not shown and detects a yaw rate and a steering angle based on the individual detection signals. The ESC-ECU 22 also receives a detection signal from a wheel speed sensor not shown and arithmetically determines a wheel speed of each of the wheels, an estimated vehicle body speed corresponding to the vehicle speed, a slip ratio, and the like based on the detection signal. The ESC-ECU 22 also causes a pressure sensor provided in the actuator for the brake fluid pressure control and not shown to detect the brake fluid pressure.

For example, when performing vehicle skid control, the ESC-ECU 22 detects a skid state based on the yaw rate or the steering angle and drives the actuator for the brake fluid pressure control based on a result of the detection to generate a braking force to be applied to a control target wheel. A yaw moment can be generated based on the braking force to inhibit a vehicle skid. When performing the automatic brake control as the drive assist control or performing brake control as the inter-vehicular distance control, the ESC-ECU 22 generates a braking force to be applied to the control target wheel to perform control for reducing a collision damage or keeping an inter-vehicular distance.

Thus, the ESC-ECU 22 is configured to acquire the vehicle data item from the detection signal from the various sensors, acquire the vehicle data item from the other ECUs, and transmit the acquired various vehicle data item to the data acquisition unit 28b.

In addition, the ESC-ECU 22 has also recognized whether the brake control including the skid prevention control and the like as the vehicle movement control is performed, a state of the control while the control is being performed, and the brake fluid pressure to the data acquisition unit 28b or to the control determination unit 28c. Note that the ESC-ECU 22 can also estimate the road surface state for the vehicle movement control. For example, the ESC-ECU 22 can also estimate the road surface state using a known method based on an acceleration/deceleration of the wheel speed. In that case, the ESC-ECU 22 can also transmit data representing a state which allowed the ESC-ECU 22 to estimate the road surface state to the data acquisition unit 28*b* or to the control determination unit 28*c*.

The navigation ECU 23 is included in a navigation system to perform acquisition of information from a non-transitory tangible storage medium such as a memory in which road information or the like is stored, measurement of the present position of the vehicle based on positional information from a GPS (abbreviation of Global Positioning System) satellite, or the like. In other words, the navigation ECU 23 performs various processes related to route guidance or the like. In addition, the navigation ECU 23 acquires traffic jam information or information related to the road surface state by the navigation ECU 23 itself or through an external communication device not shown and allows the acquired information to be reflected on the route guidance. Further, since the navigation ECU 23 processes information on the present vehicle position, the road information including the road surface state, and the like, the navigation ECU 23 transmits the present vehicle position information, the road information, and the like to the data acquisition unit 28*b*. Since the navigation ECU 23 has also acquired the weather data item and the traveling environment data item through the external communication device, the navigation ECU 23 also transmits such data items to the data acquisition unit 28*b*.

Note that the external communication device is a device for performing data communication with an information center not shown via a wireless network such as a DCM (Data Communication Module) or the like. Since the various data acquired by the external communication device from the information center is transmitted herein to the navigation ECU 23, the various data is then transmitted from the navigation ECU 23 to the data acquisition unit 28*b*. However, the various data may also be transmitted directly from the external communication device to the data acquisition unit 28*b*.

When a user is allowed to input the various data to the navigation ECU 23 through a navigation display, the navigation ECU 23 can also transmit the input data to the data acquisition unit 28*b*. For example, the navigation ECU 23 can also transmit data on a tire type or the like to the data acquisition unit 28*b*.

The engine ECU 24 performs engine control through adjustment of an engine speed, an amount of fuel injection, or the like. The engine ECU 24 processes various information to be used for the engine control such as, e.g., information related to an acceleration position. The engine ECU 24 transmits the information on the acceleration position to the receiver 21. The engine ECU 24 has recognized the presence or absence of the engine control to be performed and the state of the control while the control is being performed, and has transmitted the presence or absence of the engine control to be performed and the state of the control to the control determination unit 28*c*. Since the engine ECU 24 also processes data related to a wheel being driven and a wheel not being driven, the engine ECU 24 can also transmit such data as the vehicle data item to the data acquisition unit 28*b*.

The drive assist ECU 25 performs control for drive assistance. There are various examples of the drive assist control such as, e.g., adaptive cruise control (hereinafter abbreviated as ACC) and lane keeping assist (hereinafter abbreviated as LKA). To perform such control, a surrounding state such as surrounding vehicles including a vehicle ahead or a white line drawn along a driving lane is recognized using a radar device or a vehicle-mounted camera not shown to allow such control to be performed as the vehicle movement control corresponding to the recognized surrounding state. Since such control is well known, a detailed description is not given of such control, but the drive assist ECU 25 cooperates with each of the ECUs 22 to 24 described above to perform, as the drive assist control, the automatic brake control, the inter-vehicular distance control, or the like. To perform the drive assist control, the drive assist ECU 25 has recognized the surrounding state using the radar device and the vehicle-mounted camera, and has transmitted the surrounding state as the traveling environment data item to the data acquisition unit 28*b*.

The drive assist ECU 25 recognizes the presence or absence of the drive assist control to be performed as the vehicle movement control and the state of the control while the control is being performed, and transmits the presence or absence of the drive assist control to be performed and the state of the control to the data acquisition unit 28*b* or to the control determination unit 28*c*. Note that the drive assist ECU 25 can also estimate the road surface state through analysis of an image from the vehicle-mounted camera or the like. In that case, the drive assist ECU 25 can also transmit data representing a state which allowed the drive assist ECU 25 to estimate the road surface state to the data acquisition unit 28*b* or to the control determination unit 28*c*.

Note that an ECU or a device other than the various ECUs 22 to 25 and the external communication device each described above can also transmit the vehicle data item, the weather data item, and the traveling environment data item to the data acquisition unit 28*b*. For example, it is also possible to allow an actuation signal for a direction indicator or control data representing a control state of the vehicle movement control performed by an ECU other than the various ECUs 22 to 25 described above and the presence or absence of control to be performed to be transmitted to the data acquisition unit 28*b*.

The notification device 26 is provided by, e.g., a meter indicator or the like and used when the road surface state is reported to the driver. When the notification device 26 is provided by the meter indicator, the meter indicator is disposed at a place where the meter indicator is visually recognizable by the driver while driving the vehicle and disposed in, e.g., an instrument panel in the vehicle. When the road surface state is transmitted from the receiver 21 to the meter indicator, the meter indicator performs display in a mode in which the driver can recognize the road surface state, and thus allows the road surface state to be visually reported to the driver.

Note that the notification device 26 may also be provided by a buzzer, a voice guidance device, or the like. In that case, the notification device 26 can aurally report the road surface state to the driver using a buzzer sound or voice guidance. As the notification device 26 that performs visual reporting, the meter indicator has been described by way of example, but the notification device 26 may also be provided by a display element which displays information, such as a head-up display.

Thus, the tire system 100 according to the first embodiment is configured. Note that the individual units included in the vehicle-body-side system 2 are connected to each other via an in-vehicle LAN (abbreviation of Local Area Network) based on, e.g., CAN (abbreviation of Controller Area Network) communication or the like. This allows the individual units to transmit information to each other via the in-vehicle LAN.

Next, a description will be given of details of the feature quantities extracted by the control unit 11 described above.

The feature quantity mentioned herein is a quantity representing a feature of vibration applied to the tire 3, which have been acquired by the vibration sensor unit 10, and is represented as, e.g., the feature vector.

Figure 4:
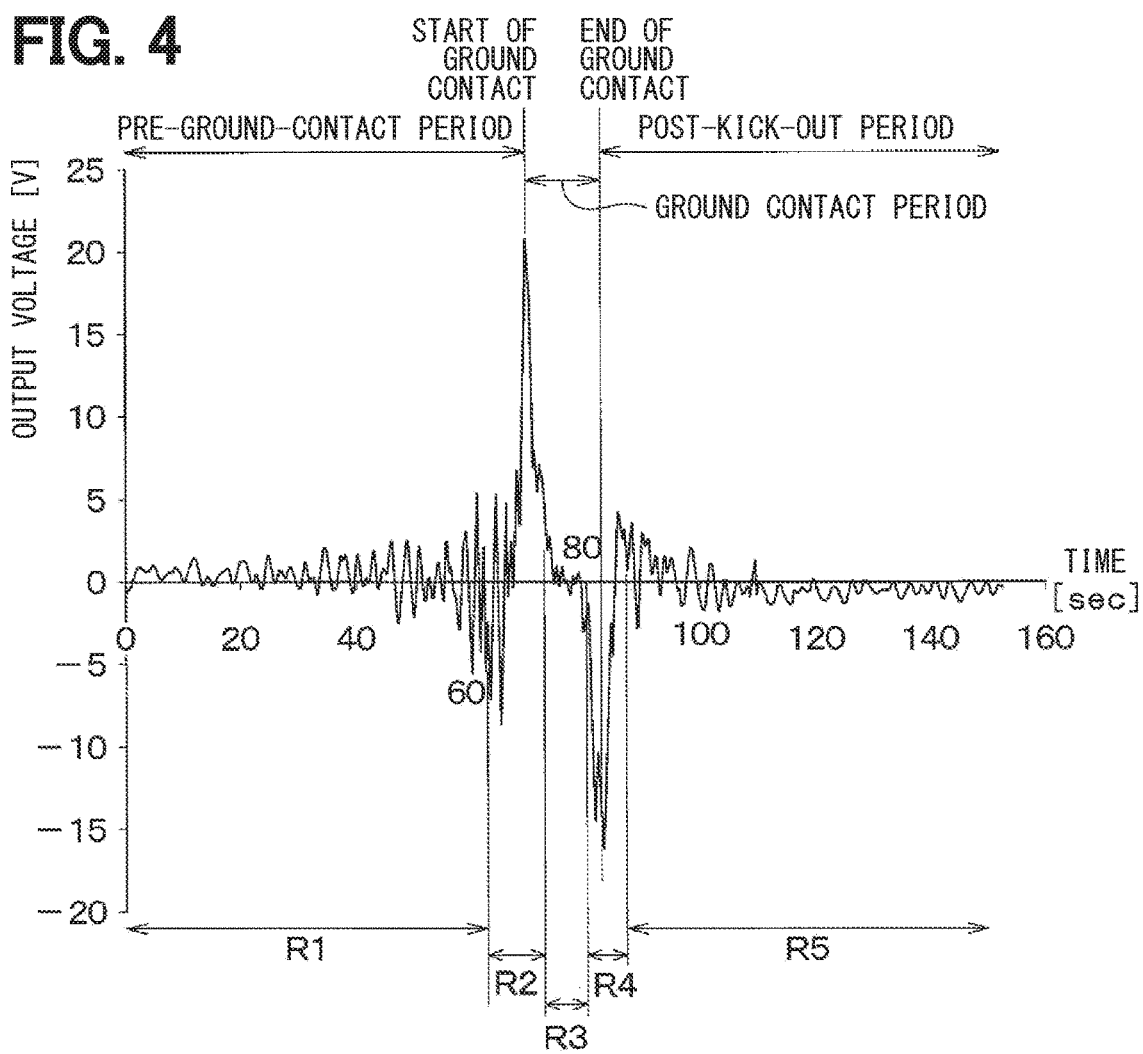
FIG. 4 is a diagram illustrating a waveform of an output voltage from a vibration sensor unit during tire rotation.

The output voltage waveform of the detection signal from the vibration sensor unit 10 during tire rotation is, e.g., the waveform illustrated in FIG. 4. As illustrated in the drawing, at a ground contact start time when a portion (hereinafter referred to as a device mounting position) of the tread 31 corresponding to a place where the vibration sensor unit 10 is disposed starts to come into contact with the ground with the rotation of the tire 3, the output voltage from the vibration sensor unit 10 has a maximum value. A peak value at the ground contact start time when the output voltage from the vibration sensor unit 10 has the maximum value is hereinafter referred to as a first peak value. As also illustrated in FIG. 4, at a ground contact end time when the device mounting position, which has been in contact with the ground, comes out of contact with the ground with the rotation of the tire 3, the output voltage from the vibration sensor unit 10 has a minimum value. A peak value at the ground contact end time when the output voltage from the vibration sensor unit 10 has the minimum value is hereinafter referred to as a second peak value.

The following is the reason why the output voltage from the vibration sensor unit 10 has the peak values at the time points described above. That is, when the device mounting position comes into contact with the ground with the rotation of the tire 3, a portion of the tire 3 which has been a generally cylindrical surface in the vicinity of the vibration sensor unit 10 receives a pressure to be deformed into a planar shape. At this time, the vibration sensor unit 10 receives an impact, and consequently the output voltage from the vibration sensor unit 10 has the first peak value. On the other hand, when the device mounting position comes out of contact with the ground contact surface with the rotation of the tire 3, the tire 3 is released from the pressure in the vicinity of the vibration sensor unit 10 and returned from the planar shape to a generally cylindrical shape. The vibration sensor unit 10 receives an impact when the tire 3 is returned to the original shape, and consequently the output voltage from the vibration sensor unit 10 has the second peak value. Thus, the output voltage from the vibration sensor unit 10 has the first and second peak values at the ground contact start time and the ground contact end time. In addition, since the direction of the impact when the tire 3 receives the pressure is opposite to the direction of the impact when the tire 3 is released from the pressure, signs of the output voltages are also opposite to each other.

A moment when the device mounting position comes into contact with the ground at the road surface is assumed to fall within a "step-on period", while a moment when the device mounting position leaves the road surface is assumed to fall within a "kick-out period". The "step-on period" includes the time point at which the first peak value is reached, while the "kick-out period" includes the time point at which the second peak value is reached. It is also assumed that a period before the "step-on period" is a "pre-step-on period", a period between the step-on period and the kick-out period, i.e., a period where the device mounting position is in contact with the ground is a "pre-kick-out period", and a period after the kick-out period is a "post-kick-out period". Thus, a period during which the device mounting position is in contact with the ground and periods before and after the period can be divided into the five periods. Note that, in FIG. 4, the "pre-step-on period", the "step-on period", the "pre-kick-out period", the "kick-out period", and the "post-kick-out period" of the detection signal are successively shown as five periods R1 to R5.

Based on the road surface state, vibration occurred in the tire 3 varies from one of the periods resulting from the segmentation to another, and the detection signal from the vibration sensor unit 10 varies from one of the periods to another. Accordingly, by subjecting the detection signal from the vibration sensor unit 10 in each of the periods to frequency analysis, the road surface state of the road surface traveled by the vehicle is detected. For example, in a slippery road surface state such as that of a hard-compacted snow road, a sheering force at a kick-out time deteriorates, and consequently a band value selected in a 1 kHz to 4 kHz band decreases in the kick-out period R4 and the post-kick-out period R5. Thus, each of frequency components of the detection signal from the vibration sensor unit 10 varies based on the road surface state, and therefore it is possible to determine the road surface state based on the frequency analysis of the detection signal.

Figure 5:
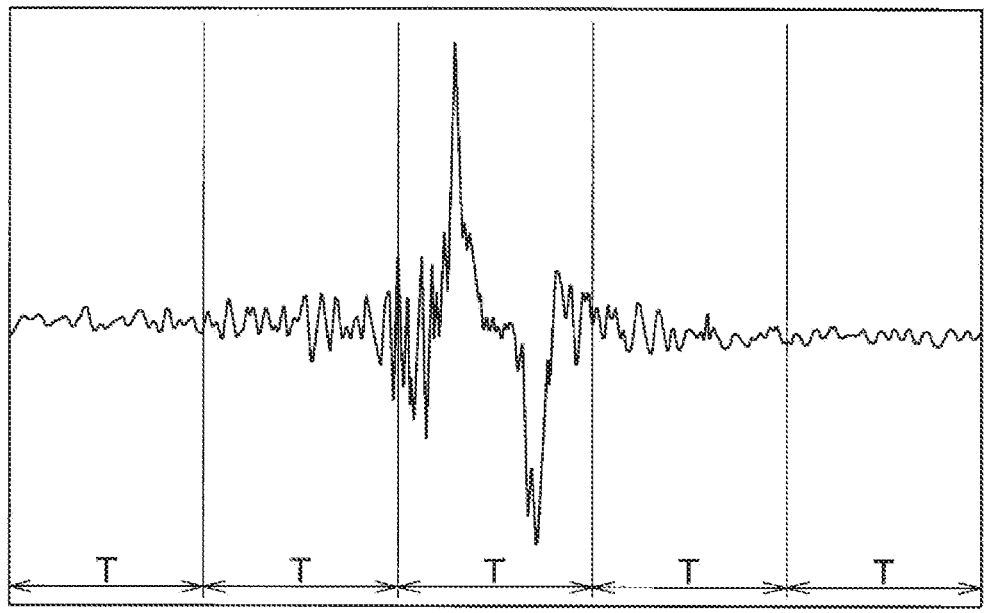
FIG. 5 is a diagram illustrating a detection signal from the vibration sensor unit which is divided by each of time windows having a predetermined time width T.

Accordingly, the waveform processing unit 11b divides, by each of time windows having a predetermined time width T, the detection signal from the vibration sensor unit 10 corresponding to one rotation of the tire 3 which exhibits a continuous time axis waveform into the plurality of segments as illustrated in FIG. 5, and performs the frequency analysis in each of the segments to extract the feature quantity. Specifically, by performing the frequency analysis in each of the segments, the waveform processing unit 11b determines a power spectral value in each of the frequency bands, i.e., a vibration level in a specified frequency band, and uses the power spectral value as the feature quantity.

Note that the number of the segments resulting from the segmentation performed using the time window having the time width T is a value which varies based on a vehicle speed, more specifically the rotating speed of the tire 3. In the following description, the number of segments corresponding to one rotation of the tire is assumed to be n (n is a natural number).

For example, the power spectral value obtained by causing the detection signal in each of the segments to pass through filters in a plurality of specified frequency bands, e.g., five bandpass filters in, e.g., a 0 to 1 kHz frequency band, a 1 to 2 kHz frequency band, a 2 to 3 kHz frequency band, a 3 to 4 kHz frequency band, and a 4 to 5 kHz frequency band are used as the feature quantities. The feature quantities are referred to as the feature vectors. When each of the power spectral values in the individual specified frequency bands is represented by $a_{ik}$, a feature vector Xi of a given segment i (where i is a natural number satisfying $1 \leq i \leq n$) is given as a matrix having the power spectral values $a_{ik}$ as elements by the following expression.

$$x_i = \begin{bmatrix} a_{i1} \\ a_{i2} \\ a_{i3} \\ a_{i4} \\ a_{i5} \end{bmatrix} \quad \text{(Expression 1)}$$

Note that k in each of the power spectral values $a_{ik}$ is the number of the specified frequency bands, i.e., the number of the bandpass filters. When the 0 to 5 kHz band is divided into the five periods as described above, k=1 to 5 is satisfied.

A determinant X collectively showing feature vectors X1 to Xn of all the segments 1 to n is (liven by the following expression.

$$X = \begin{pmatrix} a_{11} & a_{21} & \cdots & a_{n1} \\ a_{12} & a_{22} & \cdots & a_{n2} \\ a_{13} & a_{23} & \cdots & a_{n3} \\ a_{14} & a_{24} & \cdots & a_{n4} \\ a_{15} & a_{25} & \cdots & a_{n5} \end{pmatrix} \quad \text{(Expression 2)}$$

The determinant X serves as the expression representing the feature quantities corresponding to one tire rotation. The waveform processing unit 11b performs frequency analysis of the detection signal from the vibration sensor unit 10 to extract the feature quantities represented by the determinant X.

Subsequently, a description will be given of an operation of the tire system 100 according to the first embodiment.

First, in the receiver 21, the data acquisition unit 28b acquires the vehicle data item, the weather data item, or the traveling environment data item, while the control determination unit 28c determines the presence or absence of the vehicle movement control to be performed or the state of the control while the control is being performed. Then, based on details of the various data acquired by the data acquisition unit 28b or on a result of the determination made by the control determination unit 28c, the instruction determination unit 28d determines the "sensing condition" and the "signal processing condition" for the detection signal from the vibration sensor unit 10 and the "communication condition" for the communication with the vehicle-body-side system 2.

A description will be given herein of a method for the determination of the "sensing condition", the "signal processing condition", and the "communication condition" made by the instruction determination unit 28d.

The "sensing condition", the "signal processing condition", and the "communication condition" are set in terms of allowing the road surface state to be reliably determined, while reducing the power consumed in the tire-side devices 1. Specifically, the instruction determination unit 28d determines each of the conditions as follows based on the details of the various data acquired by the data acquisition unit 28b and on the result of the determination made by the control determination unit 28c.

First, the "sensing condition" includes a sampling condition, a retrieval range, a vertical resolution, a sensing frequency, the presence or absence of sensing to be performed, and the like. The sampling condition is a sampling frequency when the detection signal is sensed, i.e., a sampling interval or the like. The retrieval range is a sampling range when the detection signal is sensed, which is set as, e.g., a retrieval start time point and a retrieval end time point. The vertical resolution is a range when the waveform processing unit 11b performs A/D conversion of the detection signal, i.e., an acceleration value (hereinafter referred to as a minimum detected G value) per LSB. The sensing frequency is time intervals at which sensing is performed, which corresponds to a frequency of road surface data transmission such as, e.g., once for every 20 meters. The presence or absence of sensing to be performed indicates whether or not sensing is to be performed.

The sampling condition is determined based on, e.g., the vehicle speed included in the vehicle data item acquired by the data acquisition unit 28b. The sampling condition is determined such that, as the vehicle speed is higher, the sampling frequency is higher, i.e., sampling is performed at shorter sampling intervals.

The retrieval range is determined based on, e.g., a type of a road surface to be detected. Specifically, the type of the road surface to be detected is specified based on the weather data item or the traveling environment data item acquired by the data acquisition unit 28b, and the retrieval range is determined correspondingly to the type of the road surface. For example, when it is highly possible that the road surface state to be detected is a wet road, immediately before the device mounting position comes into contact with the ground, an amount of slip increases compared to that when the type of the road surface to be detected is another road surface, and therefore the period R2 in FIG. 4 is determined to be the retrieval range. Meanwhile, when it is highly possible that the type of the road surface to be detected is a frozen road, the device mounting position is most significantly affected by vibration resulting from a slip on the road surface while being in contact with the ground, and therefore the period R3 in FIG. 4 is determined to be the retrieval range.

The vertical resolution is determined based on, e.g., the vehicle speed included in the vehicle data item acquired by the data acquisition unit 28b. The vertical resolution is determined such that, as the vehicle speed is higher, the vertical resolution is higher, i.e., the minimum detected G value is larger. As the vehicle speed is higher, vibration due to roughness of the road surface increases to increase the vibration waveform appearing in the detection signal. Accordingly, the minimum detected G value is increased correspondingly to the size of the vibration waveform.

The sensing frequency is determined based on the road surface state and the control state of the vehicle movement control. For example, when it is assumed, from the weather data item or the traveling environment data item acquired by the data acquisition unit 28b or from the present position included in the vehicle data item, that the weather is clear and a dry road continues, the sensing frequency is determined to be lower than a sensing frequency set as a reference value. Conversely, when a change in the road surface state is expected such as when the weather is rainy weather, snowy weather, or the like or when a temperature is low, the sensing frequency is determined to be higher than the sensing frequency set as the reference value. When it is detected that the vehicle is about to make a lane change based on the vehicle data item acquired by the data acquisition unit 28b, before the lane change, the sensing frequency is determined to be higher than the sensing frequency set as the reference value. Conversely, when the vehicle is not about to make a lane change, the sensing frequency is determined to be lower than the sensing frequency set as the reference value. Note that it can be recognized based on, e.g., the activation signal for the direction indicator that the vehicle is about to make a lane change.

When it is recognized, from the control data acquired by the control determination unit 28c, that the vehicle movement control is being performed or there is a specified state during the control, the sensing frequency is set higher than the sensing frequency set as the reference value. For example, when there is a vehicle ahead of the vehicle while drive assist control is being performed, the inter-vehicular distance control or the automatic brake control may possibly be performed. Accordingly, the sensing frequency is set higher than the sensing frequency set as the reference value. Conversely, when there is no vehicle around the vehicle while the drive assist control is being performed, the possibility is low that the inter-vehicular distance control or the automatic brake control is performed. Accordingly, the sensing frequency is set lower than the sensing frequency set as the reference value.

The presence or absence of sensing to be performed is determined based on, e.g., the vehicle data item acquired by the data acquisition unit 28b. For example, there is a case where, in vehicle movement control which uses the determined road surface state, a vehicle speed range in which the control is to be performed is determined. In such a case, it is no longer necessary to estimate the road surface state when the vehicle speed is outside the vehicle speed range. In addition, there is also a state in which, even though the road surface state is determined, a satisfactory result of the determination cannot be obtained due to a rough road or the like. There may also be a state which allows the vehicle-body-side system 2 to estimate the road surface state based on the acceleration/deceleration of the wheel speed included in the vehicle data item. Therefore, in such cases, it is assumed that there is "no sensing to be performed", and sensing is not performed.

Note that the vehicle speed range in which the vehicle movement control is to be performed is determined for each control such that the control is to be performed at a rate of 100 km/h or lower. Accordingly, it may be appropriate to determine the vehicle speed range by taking into consideration all vehicle movement control which may be performed. The rough road can be recognized based on an increased variation in yaw rate obtained from a detection signal from the yaw rate sensor. The state which allows the vehicle-body-side system 2 to determine the road surface state can be recognized based on, e.g., transmission of data representing the state which allowed the ESC-ECU 22 or the drive assist ECU 25 to estimate the road surface state from the ESC-ECU 22 or the drive assist ECU 25 to the data acquisition unit 28b or the control determination unit 28c.

Next, as the "signal processing condition", there are a filtering condition, a waveform segment width, an arithmetic condition, a correction factor, a signal processing frequency, the presence or absence of signal processing to be performed, and the like. Examples of the filtering condition include a frequency band of each of a plurality of bandpass filters when filtering is performed to acquire the feature quantity, a filter constant of the bandpass filter, and the like. The waveform segment width is a length of the time width T described above. The arithmetic condition is a method of arithmetically determining the feature quantity or the like. The correction factor is a correction factor to be used when the feature quantity is arithmetically determined. For example, in the example described above, the power spectral value in the individual frequency bands is used as the feature quantity, but there are various methods of arithmetically determining the feature quantity. For example, it is also possible to perform a weighting arithmetic operation. As the arithmetic condition, selection of an arithmetic determination method can be listed. As the correction factor, a weighting correction factor to be used in the selected arithmetic determination method or the like can be listed. The signal processing frequency is a frequency with which signal processing of the detection signal is performed to determine the feature quantity. The presence or absence of signal processing to be performed indicates whether or not signal processing is to be performed on the detection signal. The signal processing frequency is typically set equal to the sensing frequency, but the signal processing frequency may also be different from the sensing frequency.

The filtering condition, the arithmetic condition, and the correction factor are determined based on, e.g., the vehicle data item and the weather data item each acquired by the data acquisition unit 28b or on the traveling environment data item acquired by the data acquisition unit 28b. Specifically, the type of the road surface to be detected, e.g., the wet road or the frozen road is specified based on the weather data item or the traveling environment data item acquired by the data acquisition unit 28b, and the filter constant, the arithmetic condition, and the correction factor are determined correspondingly to the type of the road surface. This increases differences between the feature quantity when the road surface is of the road surface type particularly to be detected and the feature quantity when the road surface is of another road surface type and allows the road surface state to be more reliably determined. In addition, the filter constant is determined based on and in accordance with the vehicle speed included in the vehicle data item acquired by the data acquisition unit 28b. When data on a tire type and data related to a wheel being driven and a wheel not being driven is included in the vehicle data item, it is also possible to determine the filter constant, the arithmetic condition, and the correction factor based on the included data.

The waveform segment width is determined based on, e.g., the vehicle speed included in the vehicle data item acquired by the data acquisition unit 28b. As the vehicle speed is higher, the waveform segment width is set smaller.

The signal processing frequency and the presence or absence of signal processing to be performed are determined using the same method as used to determine the sensing frequency and the presence or absence of sensing to be performed in the "sensing condition" described above.

As the "communication condition", a communication frequency, a connection condition, the presence or absence of communication to be performed, or the like can be listed.

The communication frequency is assumed to be equal to the sensing frequency. The communication frequency and the presence or absence of communication to be performed are determined using the same method as used to determine the sensing frequency and the presence or absence of sensing to be performed.

The connection condition is determined based on, e.g., the communication frequency. When the communication frequency is low, an interval between communication time points is increased, and therefore the connection condition is set such that a connection for bidirectional communication is cut off, and the connection is established again before the next communication time point comes.

Thus, the instruction determination unit 28d determines the various conditions which are the "sensing condition", the "signal processing condition", and the "communication condition". Then, when the various conditions are determined by the instruction determination unit 28d, the instruction data indicative of details of the determination is transmitted to each of the tire-side devices 1 through the data communication unit 27. As a result, when generating the road surface data or transmitting the road surface data to the receiver 21, each of the tire-side devices 1 sets the various conditions represented by the instruction data and generates the road surface data. When the various conditions indicate that there is communication to be performed, the instruction determination unit 28d transmits, to the receiver 21, the road surface data based on the "communication condition" indicated by the various conditions.

Meanwhile, when the road surface data is transmitted, the data communication unit 27 in the receiver 21 receives the road surface data and transmits the road surface data to the road surface determination unit 28a. Then, the road surface determination unit 28a determines the road surface state. Specifically, the road surface determination unit 28a compares the feature quantity included in the received road surface data to the support vector stored for each type of the road surface in the road surface determination unit 28a to determine the road surface state. For example, the road surface determination unit 28a determines the degrees of similarity of the feature quantity to all the support vectors stored for each type of the road surface, and determines that the road surface corresponding to the support vector having the highest degree of similarity is the presently traveled road surface.

For example, the calculation of the degrees of similarity of the feature quantity to all the support vectors stored for each type of the road surface can be performed by a method as described below.

As described above, it is assumed with respect to the determinant X representing the feature quantities that a determinant representing the feature quantities is X(r), a determinant representing the support vectors is X(s), and the power spectral values $a_{ik}$ serving as respective elements of the determinants are represented by $a(r)_{ik}$ and $a(s)_{ik}$. In that case, the determinant X(r) representing the feature quantities and the determinant X(s) representing the support vectors are represented as follows.

$$x(r) = \begin{pmatrix} a(r)_{11} & a(r)_{21} & \ldots & a(r)_{n1} \\ a(r)_{12} & a(r)_{22} & \ldots & a(r)_{n2} \\ a(r)_{13} & a(r)_{23} & \ldots & a(r)_{n3} \\ a(r)_{14} & a(r)_{24} & \ldots & a(r)_{n4} \\ a(r)_{15} & a(r)_{25} & \ldots & a(r)_{n5} \end{pmatrix} \quad \text{(Expression 3)}$$

$$x(s) = \begin{pmatrix} a(s)_{11} & a(s)_{21} & \ldots & a(s)_{n1} \\ a(s)_{12} & a(s)_{22} & \ldots & a(s)_{n2} \\ a(s)_{13} & a(s)_{23} & \ldots & a(s)_{n3} \\ a(s)_{14} & a(s)_{24} & \ldots & a(s)_{n4} \\ a(s)_{15} & a(s)_{25} & \ldots & a(s)_{n5} \end{pmatrix} \quad \text{(Expression 4)}$$

The degree of similarity represents a degree to which the feature quantities and the support vectors which are represented by the two determinants are similar to each other, and indicates that, as the degree of similarity is higher, the feature quantities and the support vectors are more similar to each other. In the case of the first embodiment, the road surface determination unit 28a determines the degree of similarity using a kernel method, and determines the road surface state based on the degree of similarity. The road surface determination unit 28a calculates herein an inner product of the determinant X(r) representing the feature quantities and the determinant X(s) representing the support vectors, i.e., a distance between respective coordinates represented by the respective feature vectors Xi of the individual segments resulting from the segmentation using each of the time windows having the predetermined time width T in a feature space, and uses the inner product as the degree of similarity.

Figure 6:
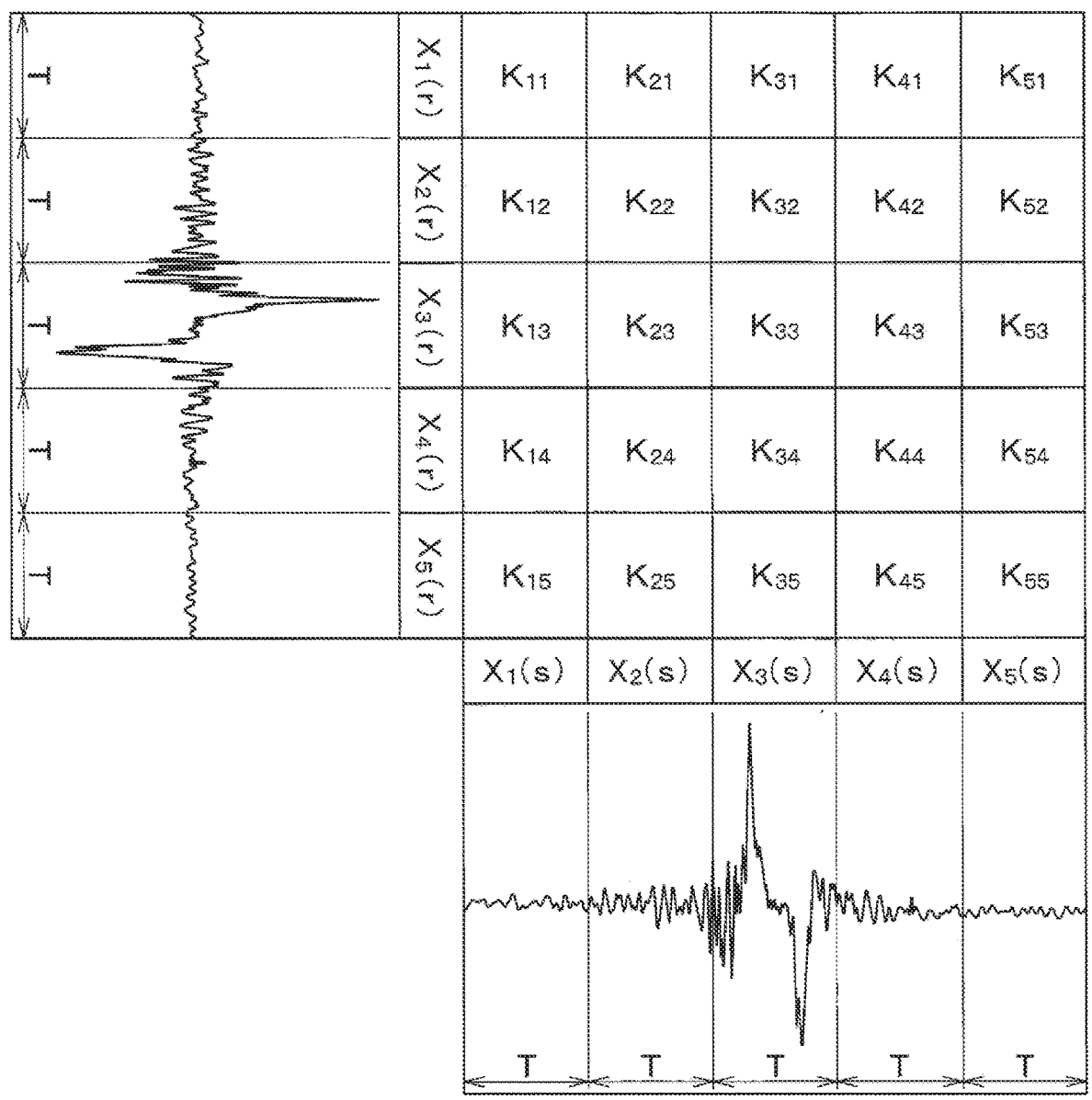
FIG. 6 is a diagram illustrating relationships between determinants Xi(r) and Xi(s) and a distance $K_{yz}$ in each of segments resulting from segmentation of a time axis waveform during a most recent rotation of the tire and a time axis waveform during an immediately previous rotation of the tire by each of the time windows having the predetermined time width T.

For example, as illustrated in FIG. 6, as the time axis waveform of the detection signal from the vibration sensor unit 10, each of the time axis waveform during the most recent rotation of the tire 3 and the time axis waveform of the support vectors is divided into individual segments by the time window having the predetermined time width T. In the case of the illustrated example, each of the time axis waveforms is divided into the five segments, and accordingly n=5 is satisfied, and i is given by $1 \leq i \leq 5$. It is assumed herein that, as illustrated in the drawing, the feature vectors Xi of the individual segments during the most recent rotation of the tire 3 are Xi(r), and the feature vectors of the individual segments of the support vectors are Xi(s). In that case, distances $K_{yz}$ between the coordinates represented by the feature vectors Xi of the individual segments are represented as in cells where cells containing the feature vectors Xi(r) of the individual segments during the most recent rotation of the tire 3, which are arranged laterally to cells containing the distances $K_{yz}$, and cells containing the feature vectors Xi(s) of the individual segments of the support vectors, which are arranged vertically to the cells containing the distances $K_{yz}$, cross each other. Note that, in each of the distances $K_{yz}$, y corresponds to i in Xi(s), while z corresponds to i in Xi(r). Actually, based on the vehicle speed, the number of the segments during the most recent rotation of the tire 3 may be different from the number of the segments of the support vectors. However, a case where the number of the segments during the most recent rotation of the tire 3 is the same as the number of the segments of the support vectors is shown by way of example.

In the case of the first embodiment, the feature vectors are acquired by dividing each of the time axis waveforms into the five specified frequency bands. Consequently, the feature vectors Xi of the individual segments are represented in a six-dimensional space including the time axis, and the distances between the coordinates represented by the feature vectors Xi of the individual segments correspond to distances between the coordinates in the six-dimensional space. However, since the distances between the coordinates represented by the feature vectors of the individual segments are smaller as the feature quantities and the support vectors are more similar to each other and larger as the feature quantities and the support vectors are less similar to each other, smaller distances represent higher degrees of similarity, while larger distances represent lower degrees of similarity.

For example, when segments 1 to n are provided by time division, each of the distances $K_{yz}$ between the coordinates represented by the feature vectors of the individual segments 1 is given by the following expression.

$$Kyz = \sqrt{\{a(r)_{11} - a(s)_{11}\}^2 + \{a(r)_{12} - a(s)_{12}\}^2 + \ldots \{a(r)_{15} - a(s)_{15}\}^2} \quad \text{(Expression 5)}$$

Thus, the distances $K_{yz}$ between the coordinates represented by the feature vectors of the individual segments obtained by time division are determined for all the segments, a total sum $K_{total}$ of the distances $K_{yz}$ for all the segments is arithmetically determined, and the total sum $K_{total}$ is used as a value corresponding to the degree of similarity. Then, the total sum $K_{total}$ is compared to a predetermined threshold Th and, when the total sum $K_{total}$ is larger than the threshold Th, it is determined that the degree of similarity is low. When the total sum $K_{total}$ is smaller than the threshold Th, it is determined that the degree of similarity is high. Such calculation of the degrees of similarity is performed with respect to all the support vectors, and it is determined that the type of the road surface corresponding to the support vectors having the highest degree of similarity is the presently traveled road surface state. Thus, the road surface state can be determined.

Note that, as a value corresponding to the degree of similarity, the total sum $K_{total}$ of the distances $K_{yz}$ each between the two coordinates represented by the feature vectors of the individual segments is used, but it is also possible to use another value as a parameter indicative of the degree of similarity. For example, as the parameter indicative of the degree of similarity, an average distance $K_{ave}$ as an average value of the distances $K_{yz}$, which is obtained by dividing the total sum $K_{total}$ by the number of the segments, can be used or, alternatively, it is also possible to determine the degree of similarity using various kernel functions. Still alternatively, it may also be possible to arithmetically determine the degree of similarity by removing paths having lower degrees of similarity from all the feature vectors without using all the feature vectors.

As described heretofore, the tire system 100 according to the first embodiment allows the road surface state of the road surface traveled by the vehicle to be determined. The various conditions when the road surface data to be used in such determination of the road surface state is generated or when the road surface data is transmitted to the vehicle-body-side system 2 are transmitted in advance as the instruction data from the vehicle-body-side system 2 to each of the tire-side devices 1. Therefore, it is possible to reliably determine the road surface state, while reducing the power consumption.

For example, the sensing frequency is set based on the road surface state or the control state of the vehicle movement control. Specifically, when it is assumed that the weather is clear and a dry road continues based on the weather data item and on the present position included in the vehicle data item or the traveling environment data item, the sensing frequency and the communication frequency are set low. Conversely, when a change in the road surface state is expected such as when the weather is rainy weather, snowy weather, or the like or when the temperature is low, the sensing frequency and the communication frequency are set high. This eliminates the need to set the sensing frequency and the communication frequency high even when the sensing frequency and the communication frequency need not be set high and can reduce the power consumption. When necessary, the sensing frequency and the communication frequency are set high to allow the road surface state to be reliably determined.

In addition, based on the control state of the vehicle movement control, the sensing frequency and the communication frequency are determined based on whether or not a change in the road surface state is to be acquired with excellent responsiveness. For example, when there is a vehicle around the subject vehicle, the sensing frequency and the communication frequency are set high while, when there is no vehicle around the vehicle, the sensing frequency and the communication frequency are set low. Consequently, when the responsiveness is pursued, the sensing frequency and the communication frequency are set high to allow the road surface state to be determined with more excellent responsiveness. Meanwhile, when the responsiveness is not pursued, the sensing frequency and the communication frequency are set low or no sensing or no communication is performed to allow a reduction in power consumption.

In addition, based on the type of the road surface to be detected, the retrieval range for the sampling is determined or the filter constant, the arithmetic condition, and the correction factor when the feature quantities are to be obtained are determined. This increases the differences between the feature quantity when the road surface is of the road surface type particularly to be detected and the feature quantity when the road surface is of another road surface type and allows the road surface state to be more reliably determined. Moreover, by setting the retrieval range, the filter constant, and the arithmetic condition each dedicated to the road surface to be detected, it is possible to reduce a processing load placed on the control unit 11, reduce the size of the microcomputer included in the control unit 11, reduce the power consumption, and consequently reduce a battery size.

The sampling frequency is set higher as the vehicle speed is higher. Conversely, when the vehicle speed is low, the sampling frequency is reduced. Consequently, when the vehicle speed is low, it is possible to reduce the number of samples and the power consumption. Meanwhile, even when the vehicle speed is high, it is possible to ensure an appropriate number of samples and reliably determine the road surface state.

Second Embodiment

A description will be given of a second embodiment. In contrast to the first embodiment, the second embodiment adds the components of the tire-side devices 1 and adds a target to be detected by the tire system 100. The second embodiment is otherwise the same as the first embodiment, and therefore a description is given only of portions different from those in the first embodiment.

In the second embodiment, the tire system 100 not only determine the road surface state, but also detects a plurality of types of detection targets which are a tire pressure, a wear state of the tire 3, and a load applied to each of the wheels.

Figure 7:
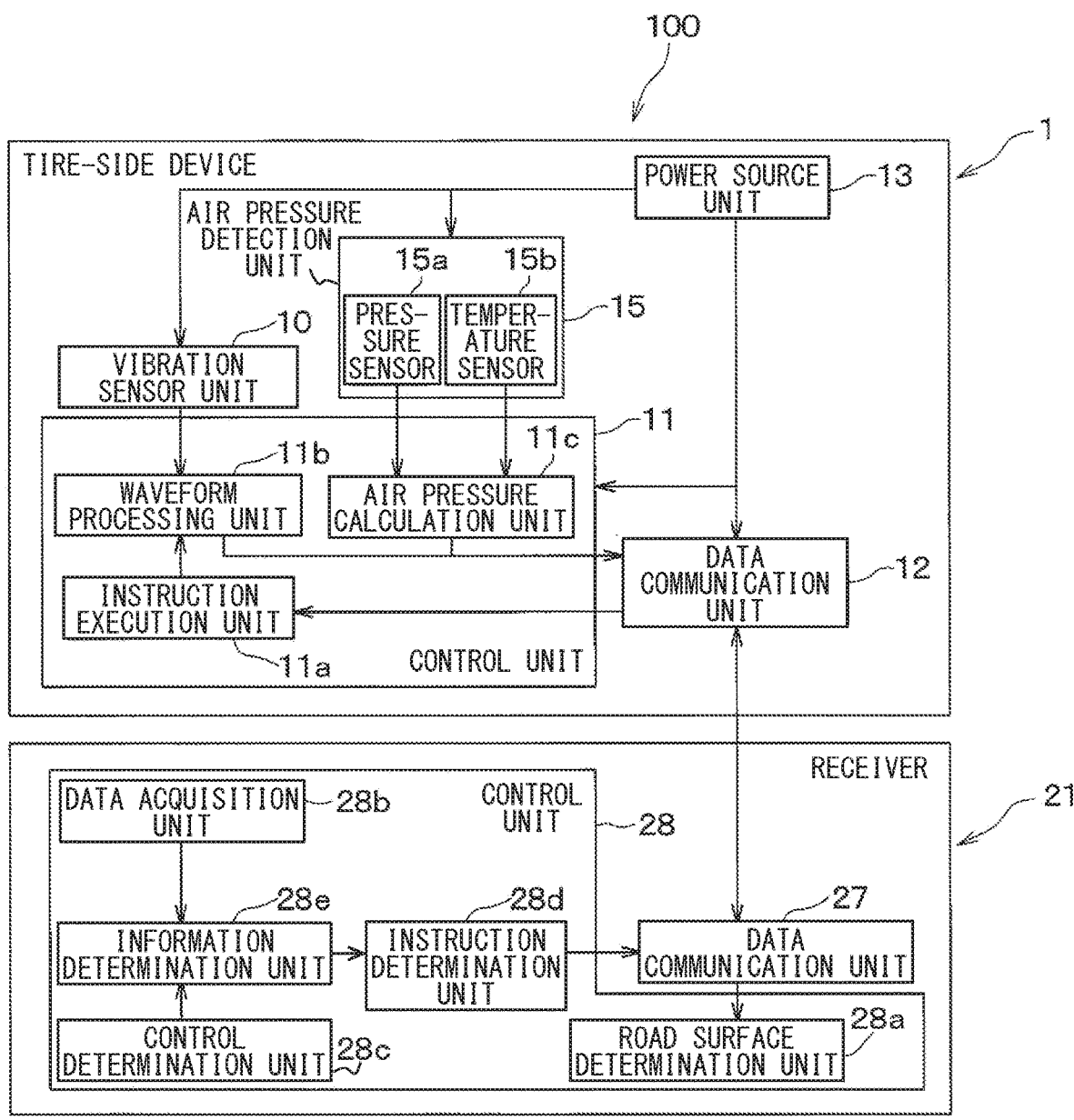
FIG. 7 is a block diagram illustrating a tire-side device and a vehicle-body-side system which are included in a tire system according to a second embodiment.

As illustrated in FIG. 7, in the second embodiment, the tire-side device 1 includes an air pressure detection unit 15.

The air pressure detection unit 15 is configured to include a pressure sensor 15a and a temperature sensor 15b. The pressure sensor 15a outputs a detection signal representing the tire pressure. The temperature sensor 15b outputs a detection signal representing an in-tire temperature. Data on the tire pressure and the temperature represented by the detection signals from the pressure sensor 15a and the temperature sensor 15b are used as data related to the tire pressure. In the second embodiment, the data on the tire pressure and the temperature represented by the detection signals from the pressure sensor 15a and the temperature sensor 15b is input to the control unit 11.

The control unit 11 also includes an air pressure calculation unit 11c. The air pressure calculation unit 11c is configured to calculate the tire pressure at a reference temperature based on the detection signal from the air pressure detection unit 15. Specifically, since the tire pressure represented by the detection signal from the pressure sensor 15a corresponds to a measured value of the tire pressure, the measured value of the tire pressure is corrected based on the temperature represented by the detection signal from the temperature sensor 15b to allow the tire pressure at the reference temperature to be calculated. In addition, the air pressure calculation unit 11c transmits a result of the calculation of the tire pressure as the data related to the tire pressure to the data communication unit 12 and causes the data communication unit 12 to transmit the result of the calculation of the tire pressure to the vehicle-body-side system 2.

While the result of the calculation of the tire pressure at the reference temperature is transmitted herein as the data related to the tire pressure, it is also possible to transmit data on the measured value of the tire pressure and the in-tire temperature. In that case, the control unit 28 converts such data to the tire pressure at the reference temperature.

Also, in the second embodiment, the control unit 11 causes the waveform processing unit 11b to extract a ground contact section for the device mounting position during a rotation of the tire 3 based on a variation with time of the output voltage from the vibration sensor unit 10. The ground contact section mentioned herein indicates a section in which the device mounting position is in contact with the ground at the road surface. Since the ground contact section is reached once every time the tire 3 rotates once, the number of rotations of the tire 3 per unit time, i.e., a rotation speed can be calculated from time intervals between the ground contact sections or the like.

Then, the waveform processing unit 11b transmits, to the data communication unit 12, data related to the extracted ground contact section and data related to the rotation speed of the tire 3 as data related to the load and data related to the wear state.

For the load, a ground contact area is determined based on a duration of the ground contact section included in the data related to the load and on a time required for one tire rotation obtained from the data related to the rotation speed of the tire 3, and the load can be calculated from an area ratio between respective ground contact areas of the four wheels. When a tire size differs from one wheel to another or when the tire pressure differs from one tire to another, correction based on the different tire sizes or the different tire pressures is performed to allow the load applied to each of the wheels to be more precisely obtained.

The wear state can be calculated based on travel distance information obtained from the present position of the vehicle transmitted from the navigation ECU 23 and on the data related to the rotation speed of the tire 3 included in the data related to the wear state. In other words, when depth of groove formed in the tread 31 of each of the tires 3 change, a circumference of the tire 3 is reduced. Accordingly, even when the same distance is traveled, the number of rotations of the tire 3 is larger after the tire 3 is worn out than before the tire 3 is worn out. As a result, the wear state of the tire 3 can be calculated based on a difference between the travel distance of the vehicle obtained from information from the navigation ECU 23 and the travel distance of the vehicle estimated from the rotation speed and the tire diameter of the tire 3 each included in the data related to the wear state. In addition, when the vehicle travels, the tire 3 is deformed by the load applied to each of the wheels, and the tire 3 is also deformed based on the tire pressure. Therefore, when the rotation speed of each of the tires 3 or the travel distance of the vehicle estimated based on the rotation speed of the tire 3 is corrected based on the load applied to each of the wheels or the tire pressure which is calculated in the manner described above, it is also possible to more precisely calculate the wear state.

Thus, the tire-side device 1 transmits, to the vehicle-body-side system 2, not only the road surface data, but also the data related to the tire pressure, the data related to the load, and even the data related to the wear state to allow the vehicle-body-side system 2 to detect the road surface state, the tire pressure, the load applied to each of the wheels, and the wear state of the tire 3.

In this case, the vehicle-body-side system 2 notifies the tire-side device 1 which data is desired to be transmitted. Specifically, as illustrated in FIG. 7, the control unit 28 of the receiver 21 is provided with an information determination unit 28e. The information determination unit 28e acquires the vehicle data item, the weather data item, or the traveling environment data item from the data acquisition unit 28b, or acquires data on the presence or absence of the vehicle movement control to be performed or the control state from the control determination unit 28c to determine the information desired to be obtained from the tire-side device 1. In other words, the information determination unit 28e determines the detection target to be detected by the tire-side device 1 and determines the information desired to be obtained is the road surface data, the data related to the tire pressure, the data related to the load, or the data related to the wear state.

For example, the road surface data is information desired to be continuously obtained during the driving of the vehicle. For the data related to the wear state, it is sufficient that the wear state can be detected at least once during a drive of the vehicle, and accordingly the data related to the wear state is information which may appropriately be obtained when, e.g., driving is started. The data related to the tire pressure is information desired to be continuously obtained at predetermined regular transmission periods. The data related to the load is information desired to be obtained when, e.g., braking/driving torque control is performed for each of the wheels as the vehicle movement control and when there is a request from the ESC-ECU 22, the engine ECU 24, or the drive assist ECU 25.

Accordingly, to allow the wear state to be detected at least once during a drive of the vehicle, the information determination unit 28e determines that the data related to the wear state is the information desired to be obtained when having successfully recognized from the vehicle data item that, e.g., the vehicle speed was generated and the vehicle started driving. Meanwhile, the information determination unit 28e determines that the data related to the load is the information desired to be obtained when the vehicle movement control is performed by the ESC-ECU 22 or the like and a signal requesting the data related to the load is transmitted to the information determination unit 28e.

Then, instruction data indicating a result of the determination made by the information determination unit 28e and a result of the determination made by the instruction determination unit 28d is transmitted from the data communication unit 27. As a result, the tire-side device 1 recognizes which one of the road surface data, the data related to the tire pressure, the data related to the load, or the data related to the wear state is to be transmitted based on the result of the determination made by the instruction determination unit 28d, and the control unit 11 performs a process in accordance with the data to be transmitted.

Specifically, when the data to be transmitted is the road surface data, the control unit 11 sets the "sensing condition" and the "signal processing condition" for the detection signal from the vibration sensor unit 10 as well as the "communication condition" based on the result of the determination made by the instruction determination unit 28d. Then, the control unit 11 generates the road surface data in accordance with the various set conditions and causes the data communication unit 12 to transmit the road surface data. Meanwhile, when the data to be transmitted is the tire pressure, the control unit 11 calculates the tire pressure at the predetermined regular transmission periods based on the detection signals from the pressure sensor 15a and the temperature sensor 15b and causes the data communication unit 12 to transmit a result of the calculation as the data related to the tire pressure.

Note that the road surface data may appropriately be transmitted based on the result of the determination made by the instruction determination unit 28d, and the data related to the tire pressure may appropriately be transmitted at the predetermined regular transmission periods. Accordingly, it is sufficient that such data items are transmitted appropriately at predetermined transmission time points without based on the result of the determination made by the information determination unit 28e.

Since the control unit 11 is notified by the instruction data that, e.g., the data to be transmitted once during a drive is the data related to the wear state, the control unit 11 causes the data communication unit 12 to transmit the data related to the wear state when notified. In addition, since the control unit 11 is notified by the instruction data that the data to be transmitted when the vehicle movement control is performed is the data related to the load, the control unit 11 causes the data communication unit 12 to transmit the data related to the load when notified.

Thus, it is also possible to allow the vehicle-body-side system 2 to show, as the instruction data, which data is required. As a result, it is possible to transmit the data required by the vehicle-body-side system 2 at an appropriate time point. In addition, in the same manner as in the first embodiment, the various conditions when the road surface data to be used in determining the road surface state is generated or when the road surface data is transmitted to the vehicle-body-side system 2 are transmitted in advance as the instruction data from the vehicle-body-side system 2 to each of the tire-side devices 1.

Therefore, it is possible to reliably determine the road surface state, while reducing the power consumption.

Other Embodiments

While the present disclosure has been described in accordance with the embodiments described above, the present disclosure is not limited to the embodiments and encompasses various modifications and variations in the equivalent range. In addition, various combinations and modes, and further, other combinations and modes including only one element thereof, less or more, are intended to fall within the scope and spirit of the present disclosure.

(1) For example, in each of the embodiments described above, the case where the vibration sensor unit 10 is provided by the acceleration sensor is shown by way of example. However, the vibration sensor unit 10 can also be provided by another element capable of detecting vibration such as, e.g., a piezoelectric element.

(2) Also, in each of the embodiments described above, as the road surface data representing the road surface state appearing in the detection signal from the vibration sensor unit 10 of the tire-side device 1, the data including the feature quantity is used. However, this is an exemplary, and another data may also be used as the road surface data. For example, integral value data of individual vibration waveforms in the five periods R1 to R5 included in the vibration data during one rotation of the tire 3 may also be used as the road surface data or, alternatively, raw data represented by the detection signal may also be used as the road surface data.

(3) Also, in each of the embodiments described above, the road surface determination unit 28a of the receiver 21 included in the vehicle-body-side system 2 determines the degree of similarity between the feature quantity and the support vector to determine the road surface state.

However, this is an exemplary, and it may also be possible that another ECU at any place in the vehicle-body-side system 2 such as, e.g., the ESC-ECU 22 determines the degree of similarity and determines the road surface state. Alternatively, it may also be possible to store the support vector in each of the tire-side devices 1 and allow the tire-side device 1 to determine the road surface state and transmit data representing a result of the determination of the road surface state as the road surface data to the vehicle-body-side system 2.

(4) In the second embodiment described above, it may also be possible to set a transmission frequency based on the instruction data from the vehicle-body-side system 2 not only for the road surface data and the data related to the load, but also for the data related to the tire pressure and the data related to the wear state.

For example, it is generally sufficient that the wear state can be detected once during a drive. However, in a state in which the wear state may more significantly affect a change in a vehicle behavior such as a surrounding state in which there are a large number of vehicles around the vehicle, it is preferred to increase the number of times the detection is performed. Accordingly, it may also be possible that the instruction determination unit 28d gives an instruction to transmit the data related to the wear state based on the traveling environment data item so as to allow data transmission to be performed a plurality of times during a drive.

The data related to the tire pressure is transmitted at the predetermined regular transmission periods. The regular transmission periods are set shorter when, e.g., a reduction in tire pressure is detected. Otherwise, it may also be possible to vary the periods based on a traveling environment or the like. For example, while the vehicle is traveling on a highway, it is preferred to transmit the data related to the tire pressure at shorter periods. Accordingly, it may also be possible that the instruction determination unit 28d gives an instruction to transmit the data related to the tire pressure based on the traveling environment data item and allows the data transmission to be performed at shorter periods.

What is claimed is:

1. A road surface state determination device comprising:
a tire-side device attached to each of a plurality of tires included in a vehicle; and
a vehicle-body-side system included in a body of the vehicle, wherein:
the tire-side device includes
a vibration detector configured to output a detection signal corresponding to a magnitude of vibration of the tire,
a processor and a memory configured to sense the detection signal and generate road surface data indicative of a road surface state appearing in a waveform of the detection signal, and
a first data communication unit configured to transmit the road surface data;
the vehicle-body-side system includes
a second data communication unit configured to perform bidirectional communication with the first data communication unit of the tire-side device by wireless communication based on BLUETOOTH Low Energy, and receive the road surface data, and
a processor and a memory configured to determine the road surface state of a road surface on which the vehicle is traveling based on the road surface data;
the vehicle-body-side system processor further configured to determine a communication frequency for transmitting the road surface data and transmit instruction data indicative of the communication frequency to the tire-side device through the wireless communication between the second data communication unit and the first data communication unit;
the tire-side device processor further configured to receive the instruction data through the wireless communication between the first data communication unit and the second data communication unit, and set the communication frequency based on the instruction data; and the communication frequency is set to be equal to a frequency of sensing of the detection signal by the vibration detector, wherein when the communication frequency indicative of the instruction data is lower than a certain value, the first data communication unit cuts off the bidirectional communication with the second data communication unit after transmitting the road surface data to the second data communication unit, and the first data communication unit and the second data communication unit establish connection again before a next communication time point comes.

2. A road surface state determination device comprising:
a tire-side device attached to each of a plurality of tires included in a vehicle; and
a vehicle-body-side system included in a body of the vehicle, wherein:
the tire-side device includes
   a vibration detector configured to output a detection signal corresponding to a magnitude of vibration of the tire,
   a processor and a memory configured to sense the detection signal and generate road surface data indicative of a road surface state appearing in a waveform of the detection signal, and
   a first data communication unit configured to transmit the road surface data;
the vehicle-body-side system includes
   a second data communication unit configured to perform bidirectional communication with the first data communication unit of the tire-side device by wireless communication based on BLUETOOTH Low Energy, and receive the road surface data transmitted from the first data communication unit, and
   a processor and a memory configured to determine the road surface state of a road surface on which the vehicle is traveling based on the road surface data;
the vehicle-body-side system processor further configured to determine a signal processing condition for the detection signal, and transmit instruction data indicative of the determination to the tire-side device through the wireless communication between the second data communication unit and the first data communication unit; and
the tire-side device processor further configured to receive the instruction data through the wireless communication between the first data communication unit and the second data communication unit, and set the signal processing condition based on the instruction data, wherein the vehicle-body-side system processor determines, as the signal processing condition, an arithmetic condition for calculating a feature quantity indicative of a feature of the vibration of the tire and a weighting correction factor for calculating the feature quantity by a weighting arithmetic operation and causes the second data communication unit to transmit, as the instruction data, the determination of the signal processing condition, the tire-side device processor acquires the feature quantity by performing the signal processing of the detection signal based on the signal processing condition, the tire-side device processor generates the road surface data including the feature quantity, the vehicle-body-side system processor stores support vectors for each type of the road surface, compares feature quantity included in the road surface data transmitted from the tire-side device with the support vectors for each type of the road surface stored in advance, and determines the road surface state of the road surface on which the vehicle is travelling, and wherein the feature quantity indicative of a feature of the vibration of the tire represents the feature quantity for one rotation of the tire, in a form of a determinant.

3. The road surface state determination device according to claim 2, wherein
the vehicle-body-side system processor determines, as the sensing condition, at least one of a sampling condition, a retrieval range, a vertical resolution, a sensing frequency, and presence or absence of the sensing to be performed, and causes the second data communication unit to transmit, as the instruction data, the determination of the sensing condition.

4. The road surface state determination device according to claim 2, wherein
the vehicle-body-side system processor performs signal processing of the detection signal to acquire a feature quantity indicative of a feature of the vibration of the tire, determines, as the signal processing condition, at least one of a filtering condition for filtering the detection signal, a waveform segment width of each of waveform segments resulting from division of a waveform of the detection signal by a predetermined time width, an arithmetic condition for calculating the feature quantity, a weighting correction factor for calculating the feature quantity by a weighting arithmetic operation, a signal processing frequency, and presence or absence of the signal processing to be performed, and causes the second data communication unit to transmit, as the instruction data, the determination of the signal processing condition.

5. The road surface state determination device according to claim 2, wherein
the vehicle-body-side system processor determines, as the communication condition, at least one of a communication frequency, a connection condition, and presence or absence of communication to be performed, and causes the second communication unit to transmit, as the instruction data, the determination of the signal processing condition.

6. The road surface state determination device according to claim 2, wherein:
the vehicle-body-side system processor is further configured to acquire at least one of a vehicle data item including at least one of a vehicle speed, a present position of the vehicle, a brake fluid pressure, an accelerator position, a steering angle, and a yaw rate, a weather data item including at least one of weather, an amount of rainfall, an amount of snowfall, and an outside temperature, and a traveling environment data item including at least one of the road surface state, a road type, and a surrounding state; and
determines at least one of the sensing condition, the signal processing condition, and the communication condition based on data acquired.

7. The road surface state determination device according to claim 2, wherein
the vehicle-body-side system processor is further configured to acquire control data for vehicle movement control and determine presence or absence of the vehicle movement control to be performed or a control state when the vehicle movement control is being performed, and determines at least one of the sensing condition, the signal processing condition, and the communication condition based on the determination made.

8. A tire system comprising the road surface state determination device according to claim 2, wherein:
the tire-side device transmits data related to one of a plurality of types of detection targets related to the tire, the plurality of types of detection targets including the road surface data;
the vehicle-body-side system processor is further configured to determine which one of the plurality of types of detection targets is to be requested as the data; and
causes the second data communication unit to transmit, to the tire-side device, the instruction data including the determination made.

9. The tire system according to claim 8, wherein the plurality of types of detection targets include at least one of a wear state of the tire, a tire pressure, and a load placed on each of wheels to which the plurality of tires are attached.

10. A tire system comprising the road surface state determination device according to claim 2, wherein:
the tire-side device transmits data related to one of a plurality of types of detection targets related to the tire, the plurality of types of detection targets including the road surface data;
the vehicle-body-side system processor is further configured to
acquire at least one of a vehicle data item including at least one of a vehicle speed, a present position of the vehicle, a brake fluid pressure, an accelerator position, a steering angle, and a yaw rate, a weather data item including at least one of weather, an amount of rainfall, an amount of snowfall, and an outside temperature, and a traveling environment data item including at least one of the road surface state, a road type, and a surrounding state,
acquire control data for vehicle movement control and determine presence or absence of the vehicle movement control to be performed or a control state when the vehicle movement control is being performed, and
determine which one of the plurality of types of detection targets is to be requested as the data; and
the vehicle-body-side system processor determines at least one of the sensing condition, the signal processing condition, and the communication condition based on the data acquired and on the determination made, and causes the second data communication unit to transmit, to the tire-side device, the instruction data including the determination made.

11. The road surface state determination device according to claim 2, wherein
the vehicle-body-side system processor performs signal processing of the detection signal to acquire a feature quantity indicative of a feature of the vibration of the tire, determines, as the signal processing condition, a filtering condition for filtering the detection signal, and causes the second data communication unit to transmit, as the instruction data, the determination of the signal processing condition.

12. The road surface state determination device according to claim 2, wherein
the vehicle-body-side system processor performs signal processing of the detection signal to acquire a feature quantity indicative of a feature of the vibration of the tire, determines, as the signal processing condition, a waveform segment width of each of waveform segments resulting from division of a waveform of the detection signal by a predetermined time width, and causes the second data communication unit to transmit, as the instruction data, the determination of the signal processing condition.

13. The road surface state determination device according to claim 2, wherein
the vehicle-body-side system processor performs signal processing of the detection signal to acquire a feature quantity indicative of a feature of the vibration of the tire, determines, as the signal processing condition, an arithmetic condition for calculating the feature quantity, and causes the second data communication unit to transmit, as the instruction data, the determination of the signal processing condition.

14. The road surface state determination device according to claim 2, wherein
the vehicle-body-side system processor performs signal processing of the detection signal to acquire a feature quantity indicative of a feature of the vibration of the tire, determines, as the signal processing condition, a weighting correction factor for calculating the feature quantity by a weighting arithmetic operation, and causes the second data communication unit to transmit, as the instruction data, the determination of the signal processing condition.

15. The road surface state determination device according to claim 2, wherein
the vehicle-body-side system processor performs signal processing of the detection signal to acquire a feature quantity indicative of a feature of the vibration of the tire, determines, as the signal processing condition, a signal processing frequency, and causes the second data communication unit to transmit, as the instruction data, the determination of the signal processing condition.

16. The road surface state determination device according to claim 2, wherein
the vehicle-body-side system processor performs signal processing of the detection signal to acquire a feature quantity indicative of a feature of the vibration of the tire, determines, as the signal processing condition, presence or absence of the signal processing to be performed, and causes the second data communication unit to transmit, as the instruction data, the determination of the signal processing condition.

17. A road surface state determination device comprising:
a tire-side device attached to each of a plurality of tires included in a vehicle; and
a vehicle-body-side system included in a body of the vehicle, wherein:
the tire-side device includes
a vibration detector configured to output a detection signal corresponding to a magnitude of vibration of the tire,
a processor and a memory configured to sense the detection signal and generate road surface data indicative of a road surface state appearing in a waveform of the detection signal, and
a first data communication unit configured to transmit the road surface data;

the vehicle-body-side system includes
- a second data communication unit configured to perform bidirectional communication with the first data communication unit of the tire-side device by wireless communication based on BLUETOOTH Low Energy, and receive the road surface data, and
- a processor and a memory configured to determine the road surface state of a road surface on which the vehicle is traveling based on the road surface data;

the vehicle-body-side system processor further configured to determine a communication frequency for transmitting the road surface data and transmit instruction data indicative of the communication frequency to the tire-side device through the wireless communication between the second data communication unit and the first data communication unit;

the tire-side device processor further configured to receive the instruction data through the wireless communication between the first data communication unit and the second data communication unit, and set the communication frequency based on the instruction data; and the communication frequency is set to be equal to a frequency of sensing of the detection signal by the vibration detector, wherein when it is determined that the vehicle is about to make a lane change, both the communication frequency and the frequency of sensing increase greater than a reference value.

* * * * *